Dec. 8, 1942.  E. G. McALLISTER  2,304,764
ENCASED ELECTRICAL UNIT
Filed Dec. 28, 1939
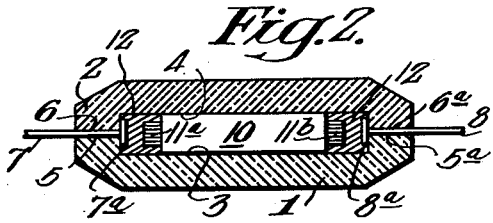
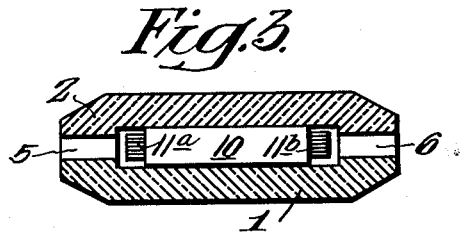
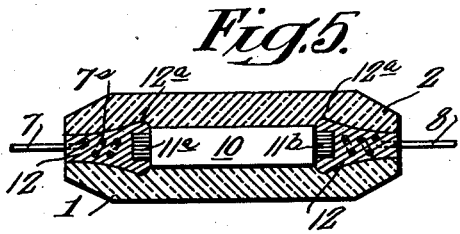
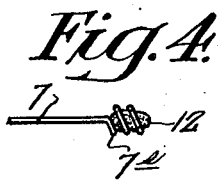
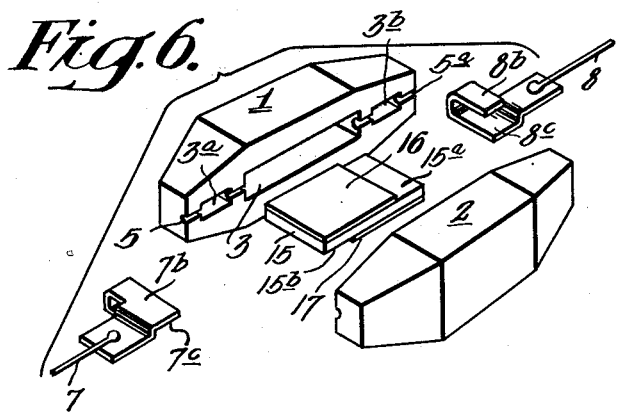
Inventor
Elvy G. McAllister
By
Attorney Patented Dec. 8, 1942

2,304,764

UNITED STATES PATENT OFFICE 2,304,764

ENCASED ELECTRICAL UNIT

Elvy G. McAllister, Audubon, N. J., assignor to Radio Corporation of America, a corporation of Delaware Application December 28, 1939, Serial No. 311,392

1 Claim. (Cl. 173—324)

This invention relates to improvements in the construction and manufacture of electrical circuit elements, such for example as capacitors, piezo-electric units, resistors, thermal cut-outs, etc., and other relatively small electrical units of the type having terminal connectors which project from a hermetically sealed embedment or from a casing.

Electrical units of the general type described are quite sensitive to such physical forces as may be transmitted thereto through their casings. Thus, any force tending to change the clamping pressure applied to a piezo-electric crystal or to a capacitor stack may result, in the case of the crystal, in a departure from its normal frequency of oscillation or, in the case of a capacitor, in a change in its calculated capacitance. Where such undesired changes occur in an enclosed unit the difficulty may usually be traced to some external force which has been transmitted to the interior of the casing through the connectors or leads to the unit. Thus, the accidental pulling or twisting of a lead in its attachment, as during its manufacture or during its connection to an external circuit, may adversely affect the operation of the unit.

Accordingly, an object of the present invention is to provide an encased electrical unit which is substantially immune to such physical forces as may be applied to its external leads.

Another and important object of the invention is to provide an extremely simple trouble-free method of manufacturing a device of the general type described, and one which lends itself readily to mass production.

Other objects and advantages will be apparent and the invention itself will be best understood by reference to the following specification and to the accompanying drawing, wherein:

Fig. 1 is a top plan view of one part of a bipart preformed casing containing a capacitor unit, a pair of unconnected leads, and some solder for connecting the leads to said capacitor.

Fig. 2 is a longitudinal sectional view of the device of Fig. 1 subsequent to the sealing operation.

Fig. 3 is a longitudinal sectional view of a thermoplastic casing containing a capacitor, but prior to having its leads affixed thereto.

Fig. 4 is a side elevational view of a lead for the device of Fig. 3.

Fig. 5 is a longitudinal sectional view of the device of Fig. 3 with its leads in place.

Fig. 6 is an exploded view of the casing and parts of a piezo-electric unit embodying the invention.

In the manufacture of the usual encased mica or paper capacitor and other small electrical units, the practice has been, first, to solder or to weld the terminal connectors to the projecting marginal edges of the metal-foil or other type electrode, then to place the otherwise finished element into a mold with the casing material and to then complete the sealing operation as by the application of heat and pressure. Since the usual molding or casing materials have very little affinity for the metals comprising the leads and other parts it follows that any undue pulling or twisting force applied to the external leads will be transmitted to the soldered or welded connection and may even destroy it.

The above and other less obvious objections to the methods and structures of the prior art are obviated in accordance with the present invention as by making a bipart preformed casing having a cavity within which the electrical unit and its terminal connectors may be dropped, or otherwise somewhat loosely arranged. Subsequent to the arrangement of the parts within the preformed cavity the external leads are soldered in situ to the unit. The solder, which preferably is of a type which expands upon cooling, completely fills the enclosed space adjacent the connecting points and produces a permanent expansion force upon the inner surfaces of the cavity and unit which serves to "lock" the leads and the unit in place. Thus any subsequent force applied to the external leads will be exerted against the interior wall of the cavity and not solely or directly to the point at which the leads are joined to the unit.

Referring to Figs. 1 and 2. In carrying the invention into effect it is preferable to provide a casing constituted of "Bakelite," styrol or other thermo-plastic or thermo-setting compound and comprising two sections 1 and 2 of duplicate size and shape. Each of these sections may be provided with a central recess or cavity 3, 4, respectively and a pair of slots 5, 5a, 6, 6a which extend in opposite directions from the cavity and communicate with the exterior of the casing. Alternatively the cavity and slots may reside entirely in one section of the casing in which case the other section may comprise a mere closure of any desired shape or contour. The dimensions of the slots 5 and 6 are preferably such as to afford a snug fit for the electrode leads 7 and 8, respectively. The long dimension of the cavity is preferably somewhat greater than is required to accommodate the terminals 7a, 8a of the leads 7 and 8 and the capacitor or other element 10 to be sealed within the casing. The smaller dimensions of the cavity, however, are preferably such as to afford a relatively tight fit for the unit.

As clearly shown in both Figs. 1 and 2 the electrical device or element 10 is provided with an outwardly extending oppositely located foil or other electrodes 11a, 11b to which the inner terminals 7a and 7b of the leads 7 and 8 must be joined. This conenction is made, in accordance with the invention, after the unit and its leads have been mounted in place within the cavity 3—4, or half cavity 3. The soldering operation may be effected either by dropping molten solder into the space defined by the opposite ends of the unit and the adjacent inner surface of the cavity or by placing a piece of solder 12 (Fig. 1) in that space and subsequently causing it to soften as by utilization of the heat and pressure employed in sealing the upper section 2 of the casing in place. In this latter case the permanent expansion force exerted upon the inner surfaces of the cavity and unit when the soldering compound has set may be regulated by a proper choice of the soldering alloy and to some extent by the compression force employed in the sealing operation.

The usual lead and tin soldering alloys may be endowed with the desired expansion characteristics by the addition of from 15 percent to 30 percent by weight of antimony. Bismuth or cadmium may be added where a solder having a low melting point is required. Alternatively, the soldering compound may comprise a cementitious substance, such for example as magnesium oxychloride cement, phosporic acid cement, plaster of Paris, Portland cement or other hydrated cement or other substance possessing the described characteristics.

Referring now to Figs. 3, 4 and 5. The soldering operation may be accomplished, if desired, after the casing sections have been molded about the unit 10, in which case the apertures 5, 6 for the leads 7 and 8 should be made large enough to permit the solder 12 to be entered into the cavity 1—2 containing the electrodes 11, 11a. As indicated in Fig. 4 the cold solder may be entered into the cavity by mounting it within a spiral 7s provided for the purpose on the end of each lead. The solder may be softened within the casing either inductively or by the application of heat to the exposed portions of the leads. In some cases (e. g., when the casing is constituted of a thermoplastic material) where the hot solder comes in contact with the inner surface of the cavity the casing material may be softened and the cavity enlarged (as indicated at 12a, Fig. 5) by the expansion force exerted thereagainst by the solder, whereby the leads are the more firmly anchored in place.

In cases where the presence of solder adjacent the unit is undesirable a multicavous casing may be provided and the unit and solder contained in separate cavities. Such an embodiment of the invention is shown in Fig. 6 wherein the casing sections 1 and 2 are each provided with a central cavity 3 and a pair of axially aligned oppositely located cavities 3a and 3b which communicate with the central cavity and with the exterior of the casing through the narrow slots 5, 5a which accommodate a pair of leads 7, 8, respectively.

The electrical unit to be contained in the central cavity 3 may comprise a piezo-electric crystal 15 having electrodes 16 and 17 arranged in staggered relation thereon in the manner claimed in copending application Serial No. 276,677 to Henry W. N. Hawk, filed May 31, 1939, issued as Patent Number 2,228,601 on January 14, 1941.

A separate mounting or clamping force is applied to the crystal 15 adjacent its exposed areas 15a and 15b through the separate electrodes 16 and 17 by means of conductive clamps 7b and 8b, respectively. The jaws of these clamps may be of any suitable design but in no event should either of them come in contact with both of the electrodes, otherwise short circuiting would occur. The clamps are provided each with conductive extensions comprising a wire or ribbon like electrode lead 7 and 8, respectively, through which the crystal may be energized.

The preferred manner of assembling the several parts of the device of Fig. 6 is as follows: The electrode leads 7, 8 are fitted into the slots 5 and 5a, respectively, in the same casing section, say, section 1. When the clamps 7b and 8b on the respective inner ends of leads 7, 8 are of the type shown in the drawing, the open side ends 7c, 8c of both clamps should be presented to the open side of the central cavity or recess 3. With the clamps in the described position, the crystal 15 and its electrodes 16 and 17 are urged into the open sides thereof so that one jaw of each clamp contacts an electrode and the other jaw contacts an exposed marginal edge of the crystal. The solder or other substance possessing the property of expanding upon setting may then be placed, in a fluid condition, in the cavities 3a and 3b through which the leads extend in order to securely anchor them in position. The other section 2 of the casing is then fitted over the first mentioned section 1. Cement may be applied between the abutting surfaces of the casing sections to form a seal, or if the casing is made of a thermoplastic (as distinguished from a thermo-setting) material, heat or heat and pressure may be applied to the casing sections to weld them together.

Various modifications of the invention will suggest themselves to those skilled in the art. Accordingly, the foregoing is to be interpreted as illustrative and not in a limiting sense except as required by the prior art and by the spirit of the appended claim.

What is claimed is:

A device of the character described comprising a casing having a central cavity and a plurality of other cavities located respectively on opposite sides of and connected respectively by passageways with said central cavity, an electrical unit and a conductive mount therefor in said central cavity, a plurality of conductors connected to said mount and extending in opposite directions, respectively, through said passageways and said other cavities, and means comprising a filling constituted of a substance which expands upon setting in said other cavities for anchoring said conductors therein and hermetically sealing said central cavity.

ELVY G. McALLISTER.